(12) United States Patent
Wu et al.

(10) Patent No.: US 11,595,958 B2
(45) Date of Patent: *Feb. 28, 2023

(54) DETERMINING A BEAM FOR PREAMBLE TRANSMISSION

(71) Applicant: Motorola Mobility LLC, Chicago, IL (US)

(72) Inventors: Lianhai Wu, Beijing (CN); Haipeng Lei, Beijing (CN); Xiaodong Yu, Beijing (CN); Haiming Wang, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,058

(22) Filed: Oct. 25, 2021

(65) Prior Publication Data

US 2022/0046630 A1 Feb. 10, 2022

Related U.S. Application Data

(63) Continuation of application No. 16/608,720, filed as application No. PCT/CN2017/083006 on May 4, 2017, now Pat. No. 11,160,079.

(51) Int. Cl.
*H04W 72/04* (2009.01)
*H04W 72/044* (2023.01)
*H04W 72/10* (2009.01)
*H04W 74/04* (2009.01)

(52) U.S. Cl.
CPC ......... *H04W 72/046* (2013.01); *H04W 72/10* (2013.01); *H04W 74/04* (2013.01)

(58) Field of Classification Search
CPC ... H04W 72/046; H04W 72/10; H04W 74/04; H04W 72/06; H04W 72/1242; H04W 74/08; H04B 7/0695
See application file for complete search history.

(56) References Cited

U.S. PATENT DOCUMENTS

| | | | | |
|---|---|---|---|---|
| 2014/0376466 | A1* | 12/2014 | Jeong | H04W 74/0833 370/329 |
| 2016/0157267 | A1* | 6/2016 | Frenne | H04W 74/0833 370/329 |
| 2016/0192401 | A1 | 6/2016 | Park et al. | |
| 2016/0302235 | A1* | 10/2016 | Hwang | H04W 52/50 |
| 2018/0084585 | A1 | 3/2018 | Lee et al. | |

FOREIGN PATENT DOCUMENTS

| | | |
|---|---|---|
| CN | 104956606 A | 9/2015 |
| CN | 106358216 A | 1/2017 |
| WO | 2010124228 A2 | 10/2010 |
| WO | 2010124228 A3 | 10/2010 |
| WO | 2014104758 A1 | 7/2014 |

\* cited by examiner

*Primary Examiner* — Thai Nguyen
(74) *Attorney, Agent, or Firm* — Kunzler Bean & Adamson

(57) ABSTRACT

Apparatuses, methods, and systems are disclosed for determining a beam for preamble transmission. One apparatus includes a processor that determines a beam from multiple beams for preamble transmission. In response to the multiple beams including one or more beams configured with a contention-free resource, the one or more beams configured with a contention-free resource have a higher priority than other beams of the multiple beams.

20 Claims, 8 Drawing Sheets

DETERMINING A BEAM FOR PREAMBLE TRANSMISSION

CROSS REFERENCE TO RELATED APPLICATIONS

This application is a continuation of application Ser. No. 16/608,720 filed on Oct. 25, 2019, which is hereby incorporated by reference in its entirety.

FIELD

The subject matter disclosed herein relates generally to wireless communications and more particularly relates to determining a beam for preamble transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a beam may be used for preamble transmission. In various configurations, multiple beams may be available for preamble transmission. In certain configurations, a beam of multiple beams available for preamble transmission may be more suitable than other beams, but the beam may not be selected for preamble transmission.

BRIEF SUMMARY

Apparatuses for determining a beam for preamble transmission are disclosed. Methods and systems also perform the functions of the apparatus. In one embodiment, the apparatus includes a processor that determines a beam from multiple beams for preamble transmission. In certain embodiments, in response to the multiple beams including one or more beams configured with a contention-free resource, the one or more beams configured with a contention-free resource have a higher priority than other beams of the multiple beams.

In one embodiment, the processor determines a set of suitable beams from the multiple beams having a signal quality greater than a predetermined threshold. In a further embodiment, the predetermined threshold is configured by a base unit. In certain embodiments, the set of beams includes the beam. In various embodiments, in response to the set of suitable beams including a single beam configured with a contention-free resource, the processor selects the single beam from the set of suitable beams as the beam for preamble transmission. In some embodiments, in response to the set of suitable beams including multiple beams configured with a contention-free resource, the processor randomly selects one beam from the multiple beams as the beam for preamble transmission. In one embodiment, in response to the set of suitable beams including multiple beams configured with a contention-free resource, the processor selects one beam with a best channel quality from the multiple beams as the beam for preamble transmission.

In certain embodiments, in response to the set of suitable beams including no beams configured with a contention-free resource, the processor randomly selects one beam from the set of suitable beams without a contention-free resource as the beam for preamble transmission. In some embodiments, in response to the set of suitable beams including no beams configured with a contention-free resource, the processor selects one beam from the set of suitable beams having a best channel quality without contention-free resource as the beam for preamble transmission. In various embodiments, the contention-free resource includes time and frequency domain resource information corresponding to a beam and a preamble. In certain embodiments, the preamble is enabled to be transmitted in each beam of the multiple beams. In one embodiment, the contention-free resource is indicated by an index. In some embodiments, the apparatus includes a transmitter that transmits the preamble transmission using the beam.

A method for determining a beam for preamble transmission, in one embodiment, includes determining a beam from multiple beams for preamble transmission. In certain embodiments, in response to the multiple beams including one or more beams configured with a contention-free resource, the one or more beams configured with a contention-free resource have a higher priority than other beams of the multiple beams.

In one embodiment, an apparatus includes a receiver that receives a preamble transmission on a beam. In various embodiments, the beam is selected from multiple beams. In certain embodiments, in response to the multiple beams including one or more beams configured with a contention-free resource, the one or more beams configured with a contention-free resource have a higher priority than other beams of the multiple beams In one embodiment, the beam is selected from a set of suitable beams from the multiple beams having a signal quality greater than a predetermined threshold. In a further embodiment, the predetermined threshold is configured by the apparatus. In certain embodiments, the set of beams includes the beam. In various embodiments, in response to the set of suitable beams including a single beam configured with a contention-free resource, the single beam from the set of suitable beams is selected as the beam for preamble transmission. In some embodiments, in response to the set of suitable beams including multiple beams configured with a contention-free resource, one beam is randomly selected from the multiple beams as the beam for preamble transmission. In one embodiment, in response to the set of suitable beams including multiple beams configured with a contention-free resource, one beam with a best channel quality is selected from the multiple beams as the beam for preamble transmission.

In certain embodiments, in response to the set of suitable beams including no beams configured with a contention-free resource, one beam from the set of suitable beams is randomly selected without a contention-free resource as the beam for preamble transmission. In some embodiments, in response to the set of suitable beams including no beams configured with a contention-free resource, one beam from the set of suitable beams having a best channel quality without contention-free resource is selected as the beam for preamble transmission. In various embodiments, the contention-free resource includes time and frequency domain resource information corresponding to a beam and a preamble. In certain embodiments, the preamble is enabled to be transmitted in each beam of the multiple beams. In one embodiment, the contention-free resource is indicated by an index.

A method for determining a beam for preamble transmission, in one embodiment, includes receiving a preamble transmission on a beam. In various embodiments, the beam is selected from multiple beams. In certain embodiments, in response to the multiple beams including one or more beams configured with a contention-free resource, the one or more beams configured with a contention-free resource have a higher priority than other beams of the multiple beams.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
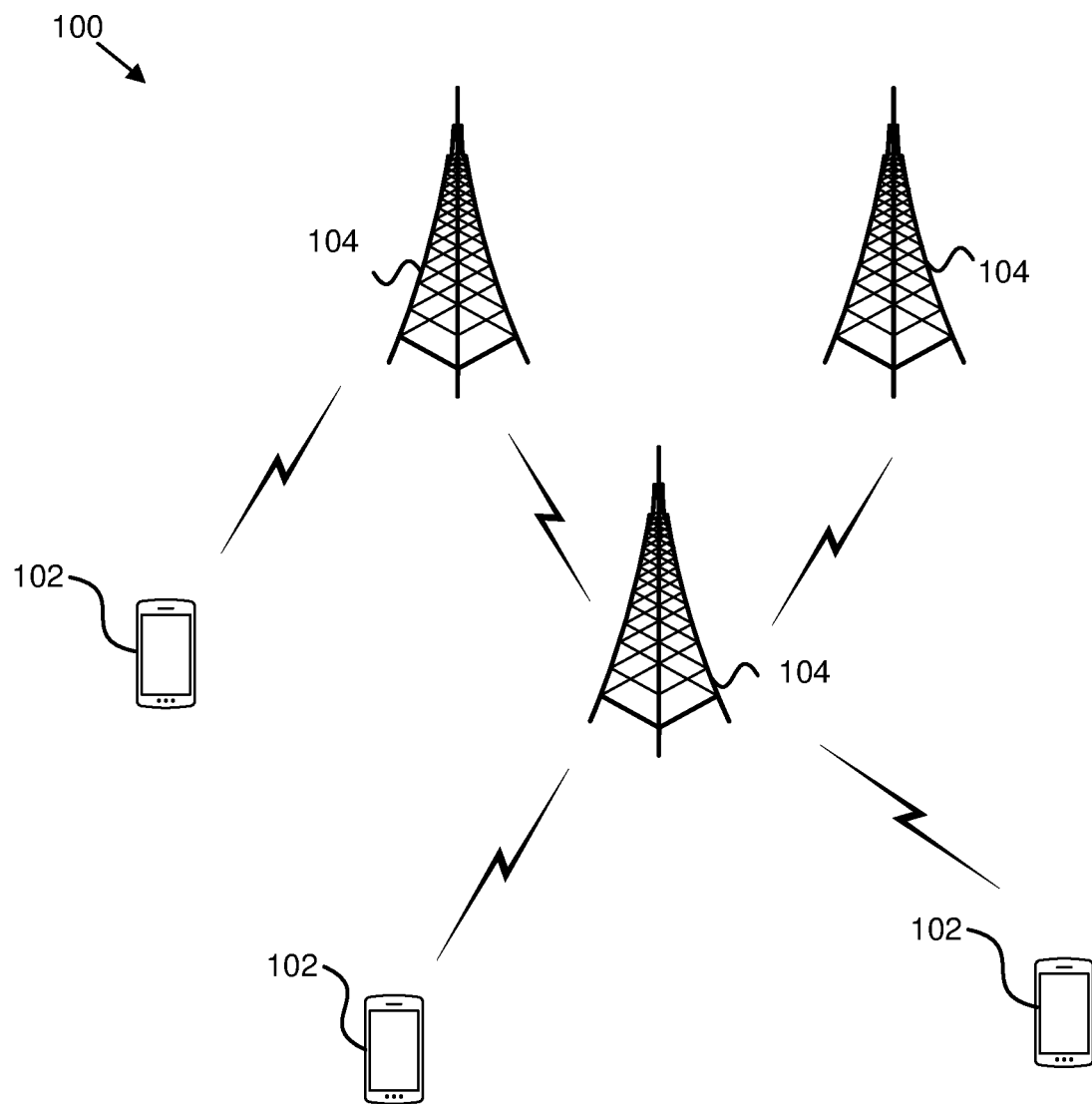
FIG. 1 is a schematic block diagram illustrating one embodiment of a wireless communication system for determining a beam for preamble transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a beam for preamble transmission. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a beam from multiple beams for preamble transmission. In certain embodiments, in response to the multiple beams including one or more beams configured with a contention-free resource, the one or more beams configured with a contention-free resource have a higher priority than other beams of the multiple beams. Accordingly, a remote unit 102 may be used for determining a beam for preamble transmission.

In certain embodiments, a base unit 104 may receive a preamble transmission on a beam. In various embodiments, the beam is selected from multiple beams. In certain embodiments, in response to the multiple beams including one or more beams configured with a contention-free resource, the one or more beams configured with a contention-free resource have a higher priority than other beams of the multiple beams. Accordingly, a base unit 104 may be used for receiving a preamble transmission.

Figure 2:
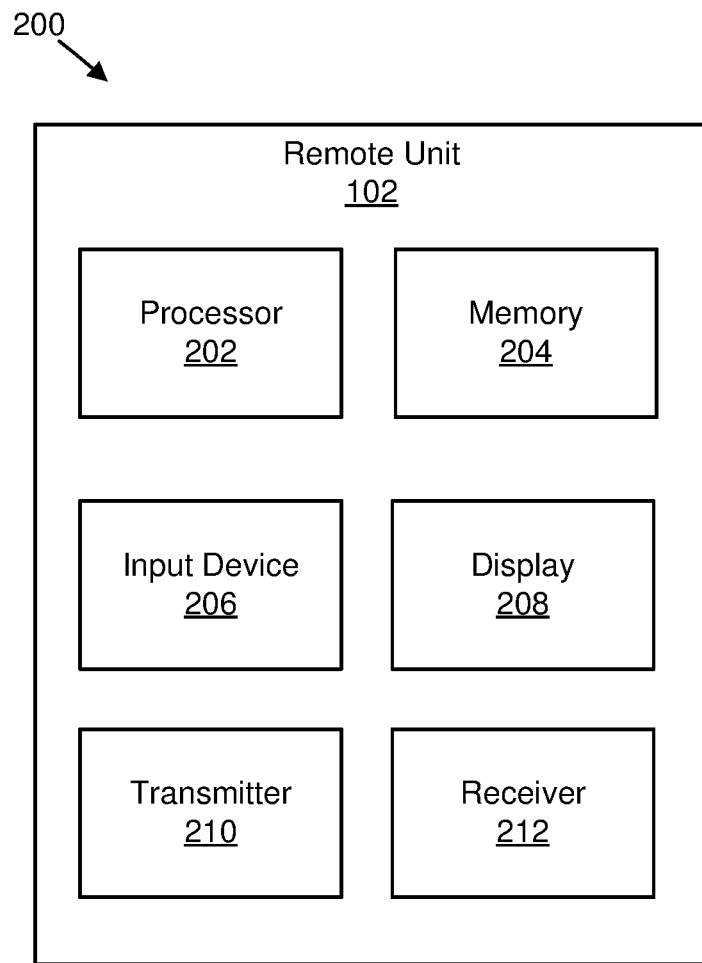
FIG. 2 is a schematic block diagram illustrating one embodiment of an apparatus that may be used for determining a beam for preamble transmission.

FIG. 2 depicts one embodiment of an apparatus 200 that may be used for determining a beam for preamble transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines a beam from multiple beams for preamble transmission. In certain embodiments, in response to the multiple beams including one or more beams configured with a contention-free resource, the one or more beams configured with a contention-free resource have a higher priority than other beams of the multiple beams. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to beam selection. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the transmitter 210 may be used to transmit a preamble. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
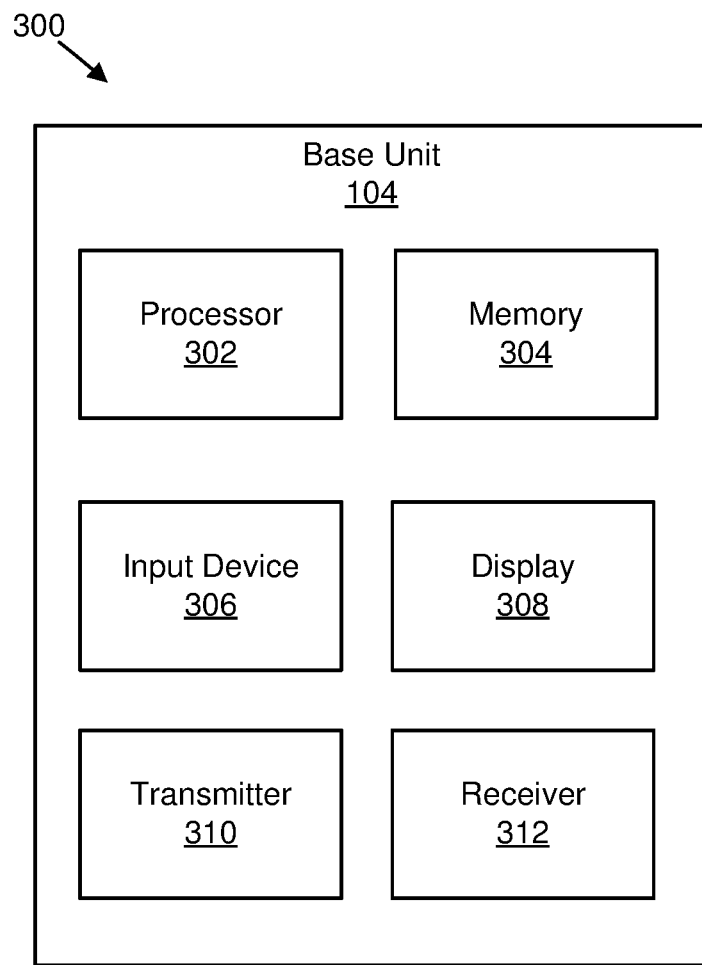
FIG. 3 is a schematic block diagram illustrating one embodiment of an apparatus that may be used for receiving a beam for preamble transmission.

FIG. 3 depicts one embodiment of an apparatus 300 that may be used for receiving a beam for preamble transmission. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may be used to receive a preamble transmission on a beam. In various embodiments, the beam is selected from multiple beams. In certain embodiments, in response to the multiple beams including one or more beams configured with a contention-free resource, the one or more beams configured with a contention-free resource have a higher priority than other beams of the multiple beams. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
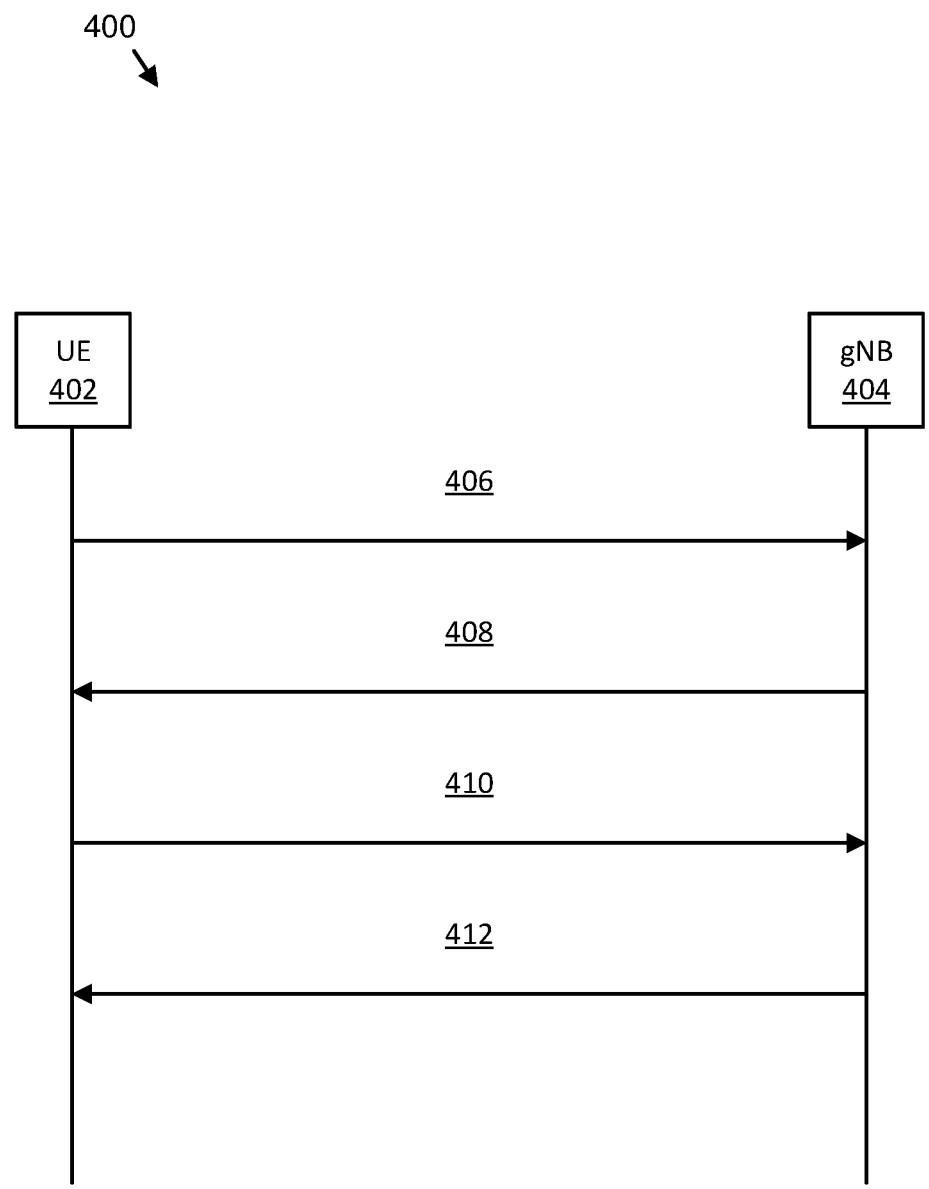
FIG. 4 illustrates one embodiment of communications for transmitting and/or receiving a preamble transmission.

FIG. 4 illustrates one embodiment of communications 400 for transmitting and/or receiving a preamble transmission. Specifically, communications between a UE 402 (e.g., remote unit 102) and a gNB 404 (e.g., base unit 104) are illustrated. The communications 400 may illustrate a contention based random access procedure.

Moreover, the communications 400 include a first communication 406 in which the UE 402 transmits a random access preamble (e.g., preamble transmission) on RACH in uplink to the gNB 404. The communications 400 include a second communication 408 in which the gNB 404 transmits a random access response generated by MAC on DL-SCH to the UE 402. Further, the communications 400 include a third communication 410 in which the UE 402 transmits a scheduled UL transmission on UL-SCH to the gNB 404. In addition, the communications 400 include a fourth communication 412 in which the gNB 404 transmits a contention resolution on DL to the UE 402.

Figure 5:
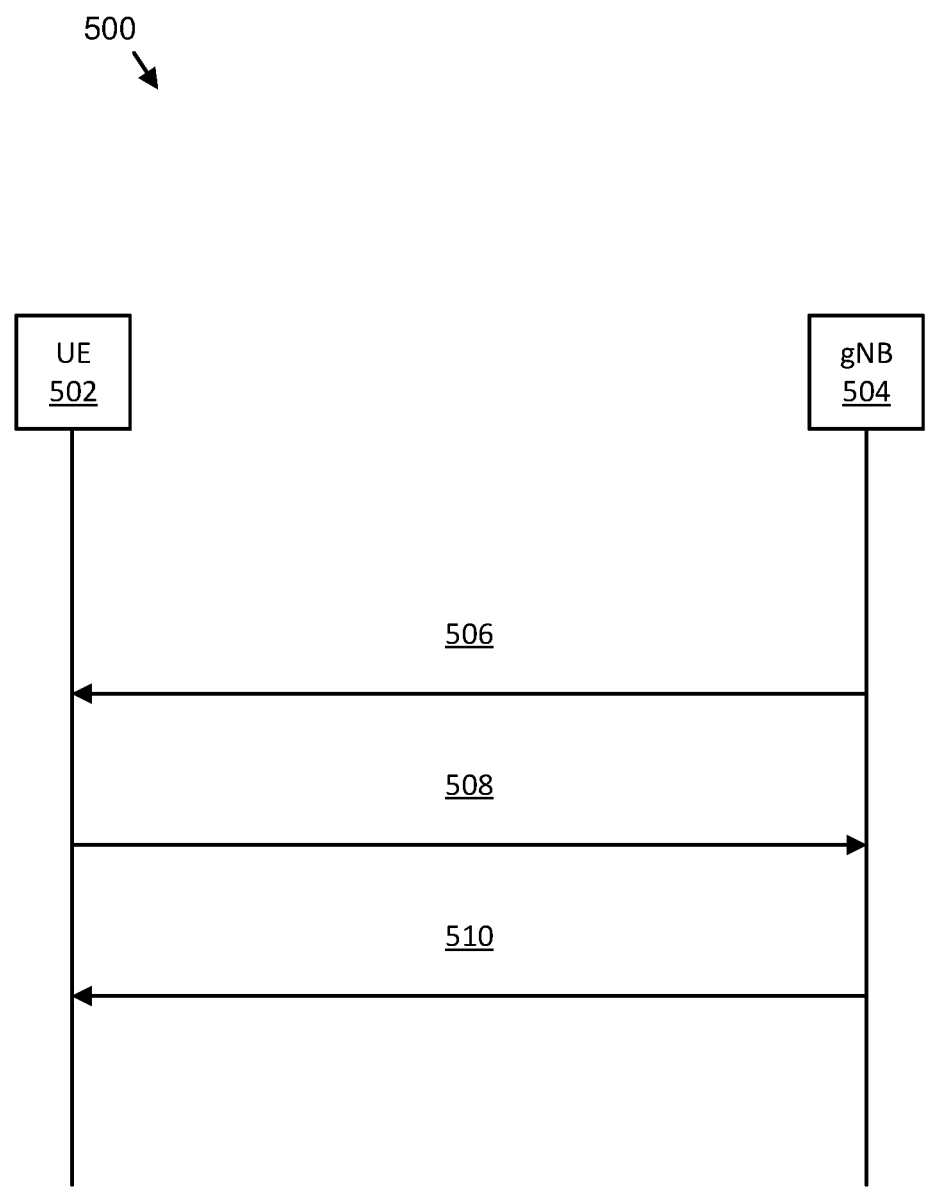
FIG. 5 illustrates another embodiment of communications for transmitting and/or receiving a preamble transmission.

FIG. 5 illustrates another embodiment of communications 500 for transmitting and/or receiving a preamble transmission. Specifically, communications between a UE 502 (e.g., remote unit 102) and a gNB 504 (e.g., base unit 104) are illustrated. The communications 500 may illustrate a contention free based random access procedure.

Moreover, the communications 500 include a first communication 506 in which the gNB 504 transmits a random access preamble assignment via dedicated signaling in DL to the UE 502. The communications 500 include a second communication 508 in which the UE 502 transmits a random access preamble (e.g., preamble transmission) on RACH in uplink to the gNB 504. The communications 500 include a third communication 510 in which the gNB 504 transmits a random access response on DL-SCH to the UE 502.

Figure 6:
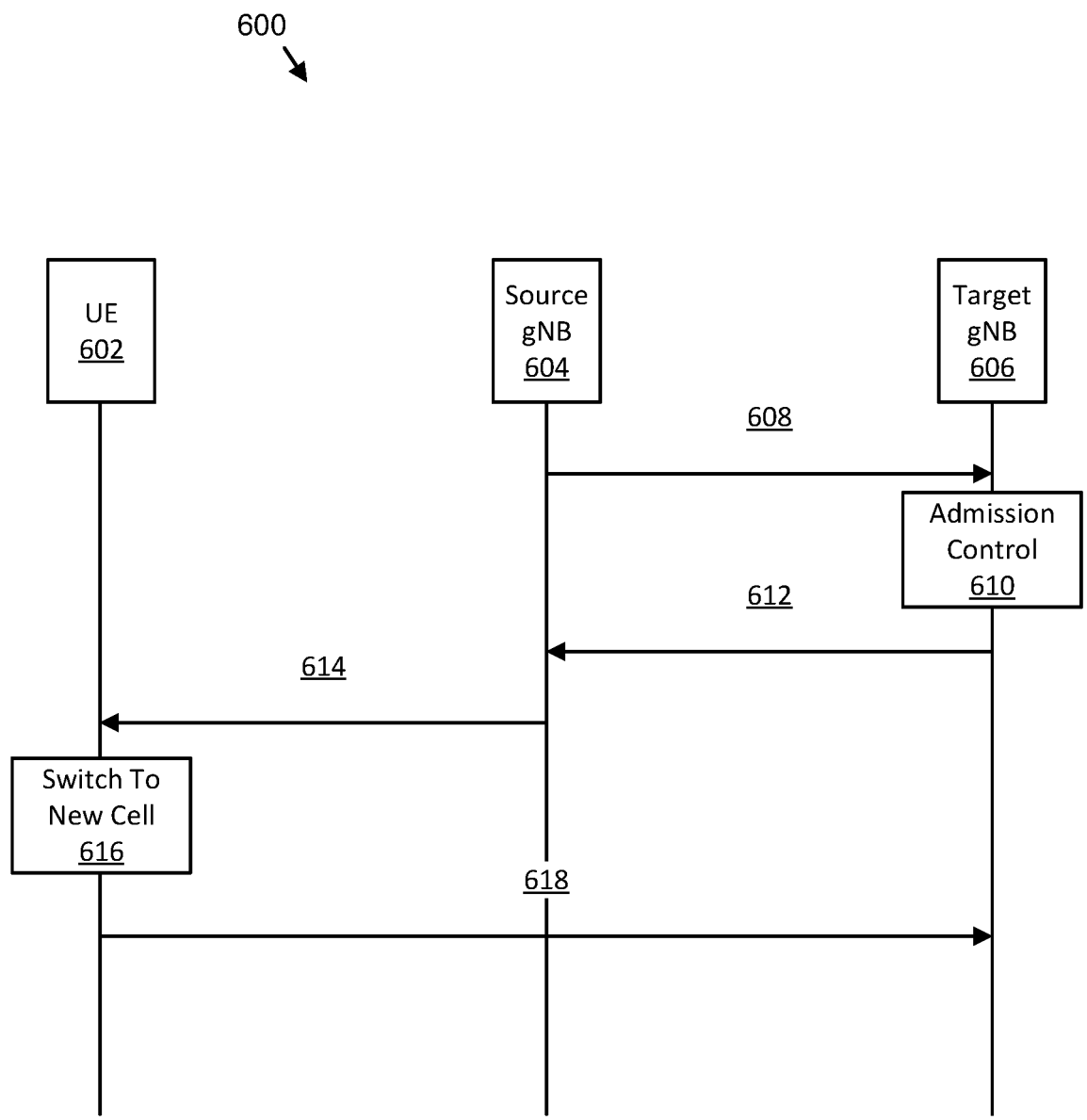
FIG. 6 illustrates one embodiment of handover communications.

FIG. 6 illustrates one embodiment of handover communications 600. Specifically, communications between a UE 602 (e.g., remote unit 102), a source gNB 604 (e.g., base unit 104), and a target gNB 606 (e.g., base unit 104) are illustrated.

Moreover, the communications 600 include a first communication 608 in which the source gNB 604 transmits a handover request to the target gNB 606. The target gNB 606 performs admission control 610. The communications 600 include a second communication 612 in which the target gNB 606 transmits a handover acknowledgement to the source gNB 604. The communications 600 include a third communication 614 in which the source gNB 604 transmits a handover command to the UE 602. The UE 602 switches 616 to the new cell. Further, the communications 600 include a fourth communication 618 in which the UE 602 transmits a handover complete message to the target gNB 606.

In certain embodiments, such as in conjunction with and/or in addition to the communications described in FIGS. 4 through 6, a remote unit 102 may be initialized for random access, select a beam to be used for transmission, transmit a preamble using the selected beam, and/or receiving a random access response.

Initialization of a remote unit 102 may be performed in various ways. In certain embodiments, contention-free resources may include time and frequency domain RACH resources associated to a beam and one dedicated preamble. In some embodiments, contention-free resources may be configured by a base unit 104. In various embodiments, a base unit 104 may configure multiple contention-free resource for beams. In one embodiment, a dedicated preamble may be transmitted in all beams within one cell. In certain embodiments, contention-free resources for random access may be provided by DCI or RRC signaling. In some embodiments, a beam may be identified by a beam identification ("ID"), synchronization signal ("SS") block, and/or a time index.

A beam of a remote unit 102 may be selected, in certain embodiments, by the remote unit 102 determining a set of suitable beams of which the signal quality is better than a threshold configured by a base unit 104. As used herein, "suitable beams" may refer to beams that have a signal quality greater and/or better than a threshold signal quality. In some embodiments, if one beam of a remote unit 102 is configured with a contention-free resource and is available in a set of suitable beams, the remote unit 102 may select this beam with a contention-free resource as a highest priority beam. In various embodiments, if there are multiple suitable beams of a remote unit 102 with a contention-free resource in a set of suitable beams, the remote unit 102 may randomly select one of the beams and/or the remote unit 102 may select a beam with the best channel quality, such as based on RSRP. In one embodiment, if there are no beams of a remote unit 102 configured with a contention-free resource in a set of suitable beams, the remote unit 102 may randomly select one of the set of suitable beams and/or the remote unit 102 may select a beam with a best channel quality, such as based on RSRP.

In various embodiments, if a contention-free resource is provided to a remote unit 102, the remote unit 102 may transmit a dedicated preamble in a configured contention-free RACH resource. In certain embodiments, if there is no contention-free resource provided to a remote unit 102, the remote unit 102 may select one preamble and transmit the selected preamble in a selected RACH resource.

In some embodiments, if a random access response contains a random access preamble ("RAP") identifier corresponding to a transmitted random access preamble and if the transmitted preamble is dedicated, a remote unit 102 may consider a random access procedure successful. In certain embodiments, if a transmitted preamble is from random selection, a remote unit 102 may consider any random access response reception successful. In some embodiments, a remote unit 102 may transmit a message including a remote unit 102 ID to a base unit 104. In such embodiments, after the base unit 104 receives this message, the base unit 102 may send a response to the remote unit 102. Further, if the remote unit 102 receives the response including a transmitted remote unit 102 ID, the remote unit 102 may consider this random access procedure successful. In certain embodiments, a remote unit 102 ID may include a system architecture evolution temporary mobile subscriber identity ("S-TMSI") and/or a random number.

Figure 7:
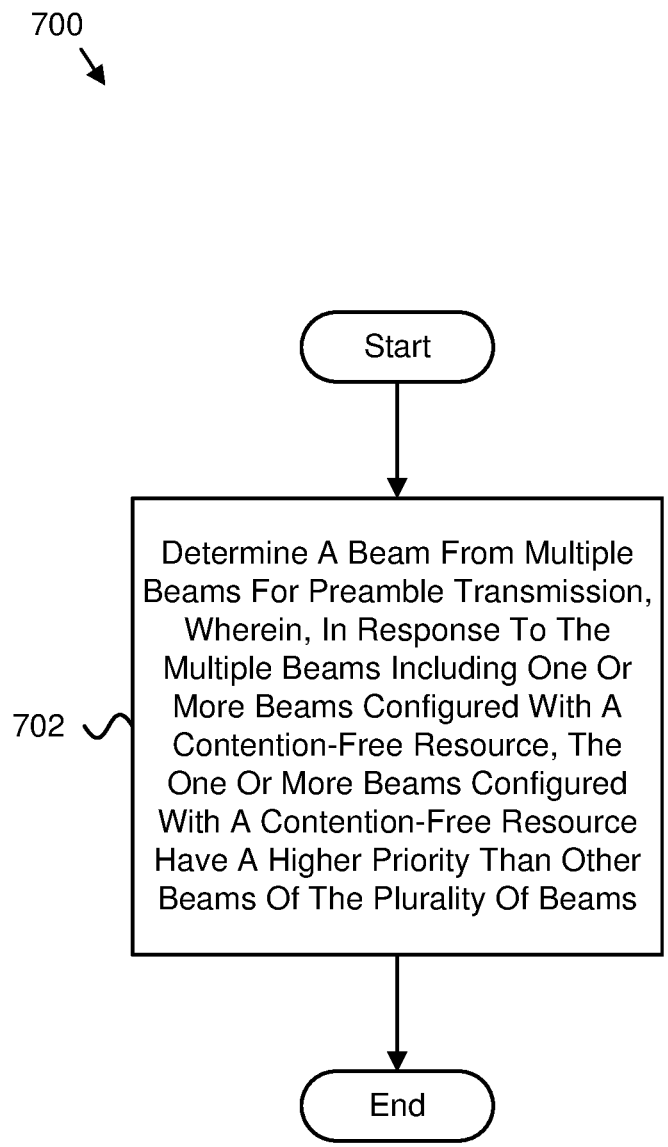
FIG. 7 is a schematic flow chart diagram illustrating one embodiment of a method for determining a beam for preamble transmission.

FIG. 7 is a schematic flow chart diagram illustrating one embodiment of a method 700 for determining a beam for preamble transmission. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 a beam from multiple beams for preamble transmission. In certain embodiments, in response to the multiple beams including one or more beams configured with a contention-free resource, the one or more beams configured with a contention-free resource have a higher priority than other beams of the multiple beams.

In one embodiment, the method 700 includes determining a set of suitable beams from the multiple beams having a signal quality greater than a predetermined threshold. In a further embodiment, the predetermined threshold is configured by a base unit. In certain embodiments, the set of beams includes the beam. In various embodiments, in response to the set of suitable beams including a single beam configured with a contention-free resource, the method 700 includes selecting the single beam from the set of suitable beams as the beam for preamble transmission. In some embodiments, in response to the set of suitable beams including multiple beams configured with a contention-free resource, the method 700 includes randomly selecting one beam from the multiple beams as the beam for preamble transmission. In one embodiment, in response to the set of suitable beams including multiple beams configured with a contention-free resource, the method 700 includes selecting one beam with a best channel quality from the multiple beams as the beam for preamble transmission.

In certain embodiments, in response to the set of suitable beams including no beams configured with a contention-free resource, the method 700 includes randomly selecting one beam from the set of suitable beams without a contention-free resource as the beam for preamble transmission. In some embodiments, in response to the set of suitable beams including no beams configured with a contention-free resource, the method 700 includes selecting one beam from the set of suitable beams having a best channel quality without contention-free resource as the beam for preamble transmission. In various embodiments, the contention-free resource includes time and frequency domain resource information corresponding to a beam and a preamble. In certain embodiments, the preamble is enabled to be transmitted in each beam of the multiple beams. In one embodiment, the contention-free resource is indicated by an index. In some embodiments, the method 700 includes transmitting the preamble transmission using the beam.

Figure 8:
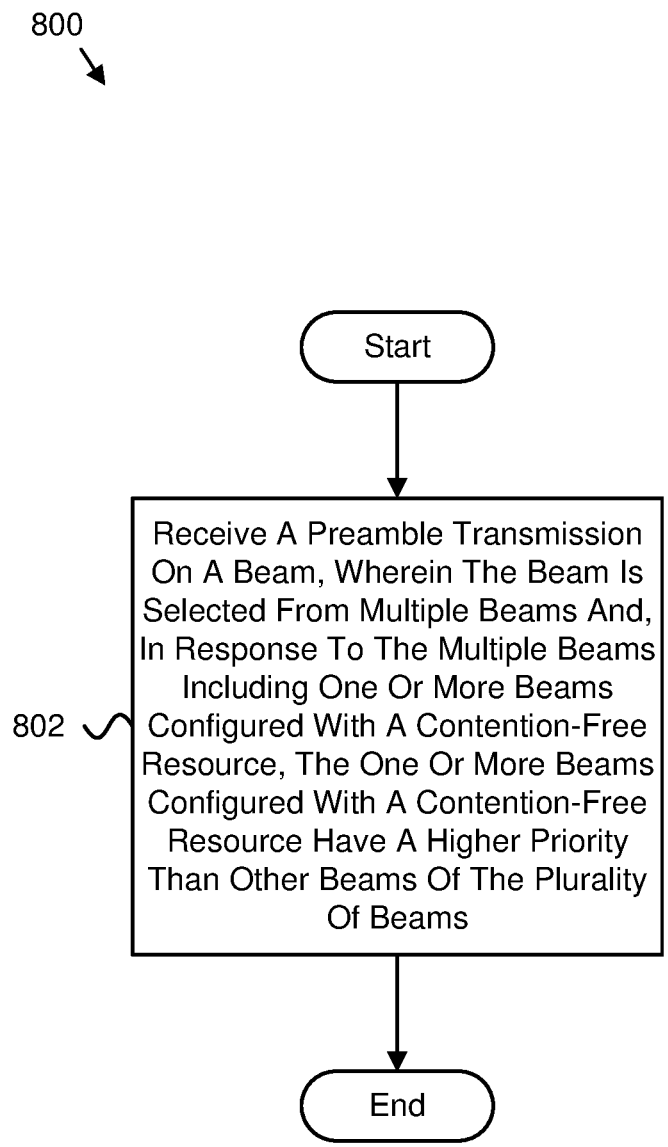
FIG. 8 is a schematic flow chart diagram illustrating one embodiment of a method for receiving a preamble transmission.

FIG. 8 is a schematic flow chart diagram illustrating one embodiment of a method 800 for receiving a preamble transmission. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a preamble transmission on a beam. In various embodiments, the beam is selected from multiple beams. In certain embodiments, in response to the multiple beams including one or more beams configured with a contention-free resource, the one or more beams configured with a contention-free resource have a higher priority than other beams of the multiple beams.

In one embodiment, the beam is selected from a set of suitable beams from the multiple beams having a signal quality greater than a predetermined threshold. In a further embodiment, the predetermined threshold is configured by an apparatus. In certain embodiments, the set of beams includes the beam. In various embodiments, in response to the set of suitable beams including a single beam configured with a contention-free resource, the single beam from the set of suitable beams is selected as the beam for preamble transmission. In some embodiments, in response to the set of suitable beams including multiple beams configured with a contention-free resource, one beam is randomly selected from the multiple beams as the beam for preamble transmission. In one embodiment, in response to the set of suitable beams including multiple beams configured with a contention-free resource, one beam with a best channel quality is selected from the multiple beams as the beam for preamble transmission.

In certain embodiments, in response to the set of suitable beams including no beams configured with a contention-free resource, one beam from the set of suitable beams is randomly selected without a contention-free resource as the beam for preamble transmission. In some embodiments, in response to the set of suitable beams including no beams configured with a contention-free resource, one beam from the set of suitable beams having a best channel quality without contention-free resource is selected as the beam for preamble transmission. In various embodiments, the contention-free resource includes time and frequency domain resource information corresponding to a beam and a preamble. In certain embodiments, the preamble is enabled to be transmitted in each beam of the multiple beams. In one embodiment, the contention-free resource is indicated by an index.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a base unit, the apparatus further comprising:
    a receiver that receives a preamble transmission on a beam, wherein the beam is selected by a user equipment from a plurality of beams, and, in response to the plurality of beams comprising one or more beams that are configured with a contention-free resource, the one or more beams that are configured with a contention-free resource have a higher priority than other beams of the plurality of beams, wherein the user equipment:
    determines a set of suitable beams from the plurality of beams having a signal quality greater than a predetermined threshold;
    in response to the set of suitable beams comprising a single beam configured with the contention-free resource, selects the single beam from the set of suitable beams as the beam for preamble transmission;
    in response to the set of suitable beams comprising multiple beams configured with the contention-free resource, selects one beam from the multiple beams as the beam for preamble transmission; and
    in response to the set of suitable beams comprising no beams configured with the contention-free resource, selects one beam from the set of suitable beams without a contention-free resource as the beam for preamble transmission; and
    a transmitter that transmits a response to the reception of the preamble transmission.

2. The apparatus of claim 1, wherein the transmitter transmits the response to the preamble transmission using a medium access control transmission.

3. The apparatus of claim 1, wherein the transmitter transmits the response to the preamble transmission using a downlink shared channel transmission.

4. The apparatus of claim 1, wherein the receiver receives an uplink transmission from the user equipment.

5. The apparatus of claim 4, wherein the uplink transmission is a shared channel uplink transmission.

6. The apparatus of claim 4, wherein the transmitter transmits a contention resolution message to the user equipment in response to the receiver receiving the uplink transmission.

7. A method of a base unit, the method comprising:
    receiving a preamble transmission on a beam, wherein the beam is selected by a user equipment from a plurality of beams, and, in response to the plurality of beams comprising one or more beams that are configured with a contention-free resource, the one or more beams that are configured with a contention-free resource have a higher priority than other beams of the plurality of beams, wherein the user equipment:
        determines a set of suitable beams from the plurality of beams having a signal quality greater than a predetermined threshold;
        in response to the set of suitable beams comprising a single beam configured with the contention-free resource, selects the single beam from the set of suitable beams as the beam for preamble transmission;
        in response to the set of suitable beams comprising multiple beams configured with the contention-free resource, selects one beam from the multiple beams as the beam for preamble transmission; and
        in response to the set of suitable beams comprising no beams configured with the contention-free resource, selects one beam from the set of suitable beams without a contention-free resource as the beam for preamble transmission; and
    transmitting a response to the reception of the preamble transmission.

8. The method of claim 7, further comprising transmitting the response to the preamble transmission using a medium access control transmission.

9. The method of claim 7, further comprising transmitting the response to the preamble transmission using a downlink shared channel transmission.

10. The method of claim 7, further comprising receiving an uplink transmission from the user equipment.

11. The method of claim 10, wherein the uplink transmission is a shared channel uplink transmission.

12. The method of claim 10, further comprising transmitting a contention resolution message to the user equipment in response to receiving the uplink transmission.

13. An apparatus comprising a user equipment, the apparatus further comprising:
    a processor that:
        determines a beam from a plurality of beams for preamble transmission, wherein, in response to the plurality of beams comprising one or more beams that are configured with a contention-free resource, the one or more beams that are configured with a contention-free resource have a higher priority than other beams of the plurality of beams; and determines a set of suitable beams from the plurality of beams having a signal quality greater than a predetermined threshold;

wherein:

in response to the set of suitable beams comprising a single beam configured with the contention-free resource, the processor selects the single beam from the set of suitable beams as the beam for preamble transmission;

in response to the set of suitable beams comprising multiple beams configured with the contention-free resource, the processor selects one beam from the multiple beams as the beam for preamble transmission; and in response to the set of suitable beams comprising no beams configured with the contention-free resource, the processor selects one beam from the set of suitable beams without a contention-free resource as the beam for preamble transmission.

14. The apparatus of claim 13, wherein the predetermined threshold is configured by a base unit.

15. The apparatus of claim 13, wherein the set of suitable beams comprises the beam.

16. The apparatus of claim 13, wherein, in response to the set of suitable beams comprising multiple beams configured with the contention-free resource, the processor selects one beam with a best channel quality from the multiple beams as the beam for preamble transmission.

17. The apparatus of claim 13, wherein, in response to the set of suitable beams comprising no beams configured with the contention-free resource, the processor selects one beam from the set of suitable beams having a best channel quality without contention-free resource as the beam for preamble transmission.

18. The apparatus of claim 13, wherein the contention-free resource comprises time and frequency domain resource information corresponding to a beam and a preamble.

19. The apparatus of claim 18, wherein the preamble is enabled to be transmitted using any beam of the plurality of beams.

20. The apparatus of claim 18, wherein the contention-free resource is indicated by an index.

* * * * *